United States Patent [19]

Swayze

[11] Patent Number: 5,319,404
[45] Date of Patent: Jun. 7, 1994

[54] COMPACT CAMERA WITH DUAL-PIVOT FOLDING FLASH UNIT

[75] Inventor: Samuel F. Swayze, Fairport, N.Y.

[73] Assignee: Eastman Kodak Company, Rochester, N.Y.

[21] Appl. No.: 4,330

[22] Filed: Jan. 14, 1993

[51] Int. Cl.⁵ ............................................. G03B 15/03
[52] U.S. Cl. ................................................ 354/149.11
[58] Field of Search ............... 354/126, 149.1, 149.11, 354/187, 288

[56] References Cited

U.S. PATENT DOCUMENTS

| | | | |
|---|---|---|---|
| 4,350,420 | 9/1982 | Engelsmann et al. | 354/126 X |
| 4,601,561 | 7/1986 | Yamashita | 354/149.11 |
| 4,688,913 | 8/1987 | Whiteside et al. | 354/149.11 |
| 4,723,140 | 2/1988 | Whiteside et al. | 354/86 |

Primary Examiner—Howard B. Blankenship
Attorney, Agent, or Firm—Roger A. Fields

[57] ABSTRACT

A compact camera has a flash unit comprising a flash arm pivotally connected to the camera body for movement between a folded position substantially flat against a top face of the camera body and an unfolded position standing up from the top face and a flash head pivotally connected to the flash arm for movement between a folded position covering a lens opening in a front face of the camera body when the flash arm is in its folded position and an unfolded position standing out from the front face. The flash head is releasably held in its folded position to similarly hold the flash arm in its folded position.

7 Claims, 5 Drawing Sheets

COMPACT CAMERA WITH DUAL-PIVOT FOLDING FLASH UNIT

BACKGROUND OF THE INVENTION

1. Field of the Invention

The invention relates generally to the field of photography, and in particular to a compact camera with a pivotably folding flash unit. More specifically, the invention relates to a compact camera having a flash unit that is flipped up from the camera body to be used and is flipped down against the camera body for storage.

2. Description of the Prior Art

A current trend in most camera design is to incorporate an electronic flash unit in the camera housing and yet make the housing relatively small in order to improve its ease of storage, portability and handling. As a consequence of making the camera housing small, however, the separation between the built-in flash unit and the taking lens is reduced, which possibly creates an undesirable effect commonly known as "red-eye". When using a flash unit and color print film, red-eye is typified by the pupils in the eyes of a person being photographed coming out red-tinted on a resulting color print. This phenomenon is attributable to the incidence into the taking lens of the red light reflected from the retinas in the person's eyes illuminated by the flash light.

Red-eye may be substantially avoided by increasing the separation between the flash unit and the taking lens. As a result, the light emitted from the flash unit will reach the eyes of a person being photographed at too great an angle to be reflected by his or her retinas into the taking lens. In this connection, U.S. Pat. No. 4,723,140, issued Feb. 2, 1988, and U.S. Pat. No. 4,688,913, issued Aug. 25, 1987, each disclose a folding camera wherein a housing cover portion including a taking lens and a flash unit is pivotable relative to a housing main portion between a closed or folded portion in which the taking lens and the flash unit are concealed within the housing main portion and an open or unfolded position in which the taking lens and the flash unit are elevated above the housing main portion. Once the housing cover portion is raised to its open position, a flash head can be pivoted out of the housing cover portion to orient the flash head in the same direction as the taking lens.

Problem to Be Solved by the Invention

In prior art U.S. Pat. Nos. 4,723,140, and 4,688,913, because the taking lens is pivoted with the flash unit out of the housing main portion, there can only be limited separation between the flash head and the taking lens when the flash head is pivoted out of the housing cover portion. Thus, red-eye may not be substantially avoided.

SUMMARY OF THE INVENTION

According to the invention, a compact camera comprising a camera body, a flash arm having a pivotal connection with the camera body for movement towards the camera body to a folded position and away from the camera body to an unfolded position, and a flash head having a pivotal connection with the flash arm for movement towards the flash arm to a folded position and away from the flash arm to an unfolded position, is characterized in that:

the camera body has a front face with a lens opening for a taking lens and a top face joined at a juncture with the front face; and the pivotal connection of the flash head with the flash arm is located proximate the juncture of the front face and the top face when the flash arm is in its folded position to permit the flash head to lie substantially flat against the front face to cover the lens opening in its folded position and to stand out from the front face to uncover the lens opening in its unfolded position.

More specifically, the camera body has a rear face joined at a juncture with the top face, and the pivotal connection of the flash arm with the camera body is located proximate the juncture of the top face and the rear face to permit the flash arm to lie substantially flat against the top face in its folded position and to stand up from the top face in its unfolded position.

Consequently, a greater separation between the taking lens and the flash head can be obtained as compared to prior art U.S. Pat. Nos. 4,723,140, and 4,688,913, when the flash head and the flash arm are in their unfolded positions. Thus, red-eye may be substantially avoided.

DETAILED DESCRIPTION OF THE PREFERRED EMBODIMENT

The invention is disclosed as being embodied in a compact camera with a pivotably folding electronic flash unit. Because such photographic cameras and flash units are known, this description is directed in particular to camera and flash elements forming part of or cooperating directly with the preferred embodiment. It is to be understood, however, that camera and flash elements not specifically shown or described may take various forms known to persons of ordinary skill in the art.

Figure 1:
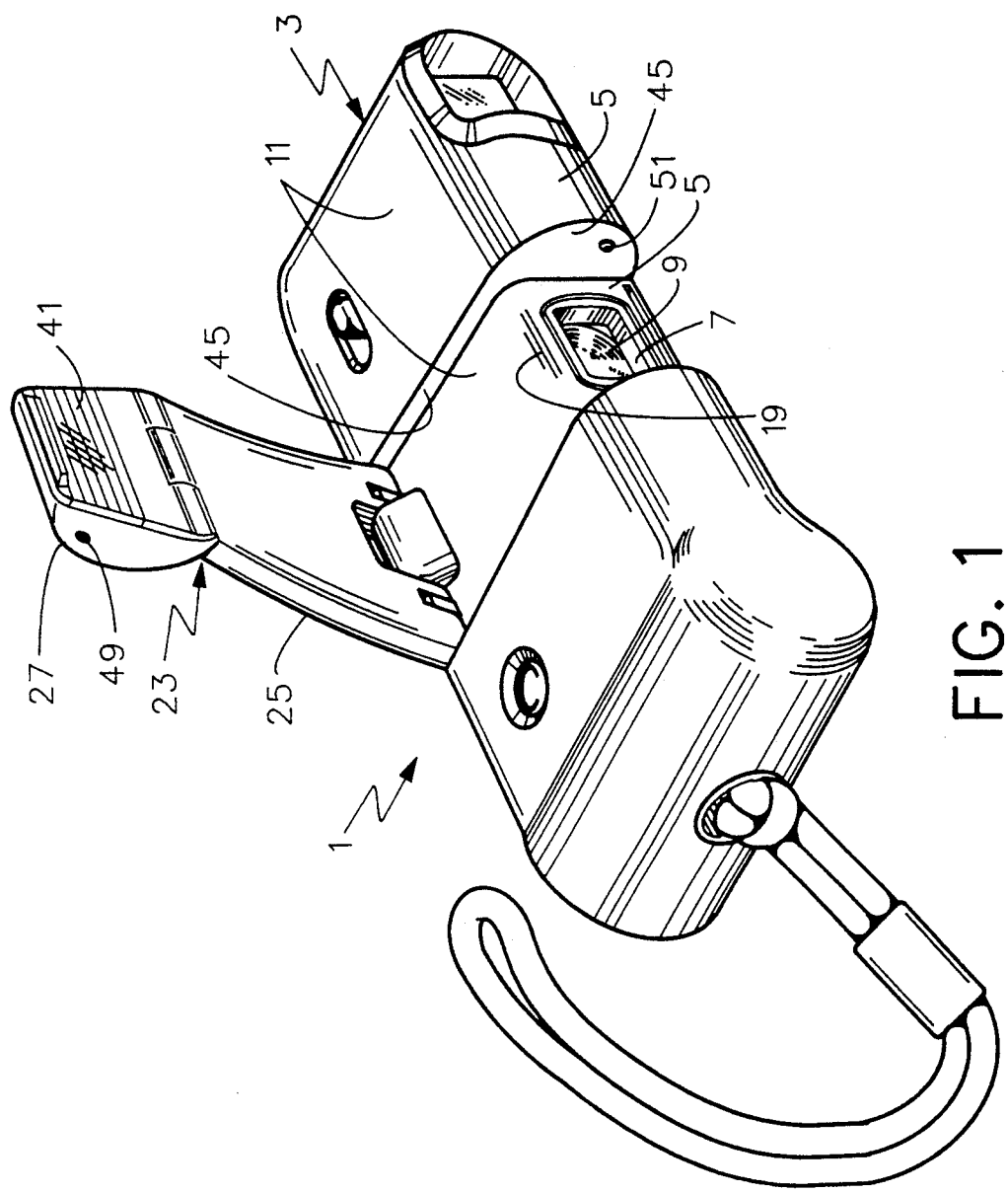
FIG. 1 is a front perspective view of a compact camera with a dual-pivot folding flash unit according to a preferred embodiment of the invention, showing the flash unit in a completely unfolded or operative position.
Figure 2:
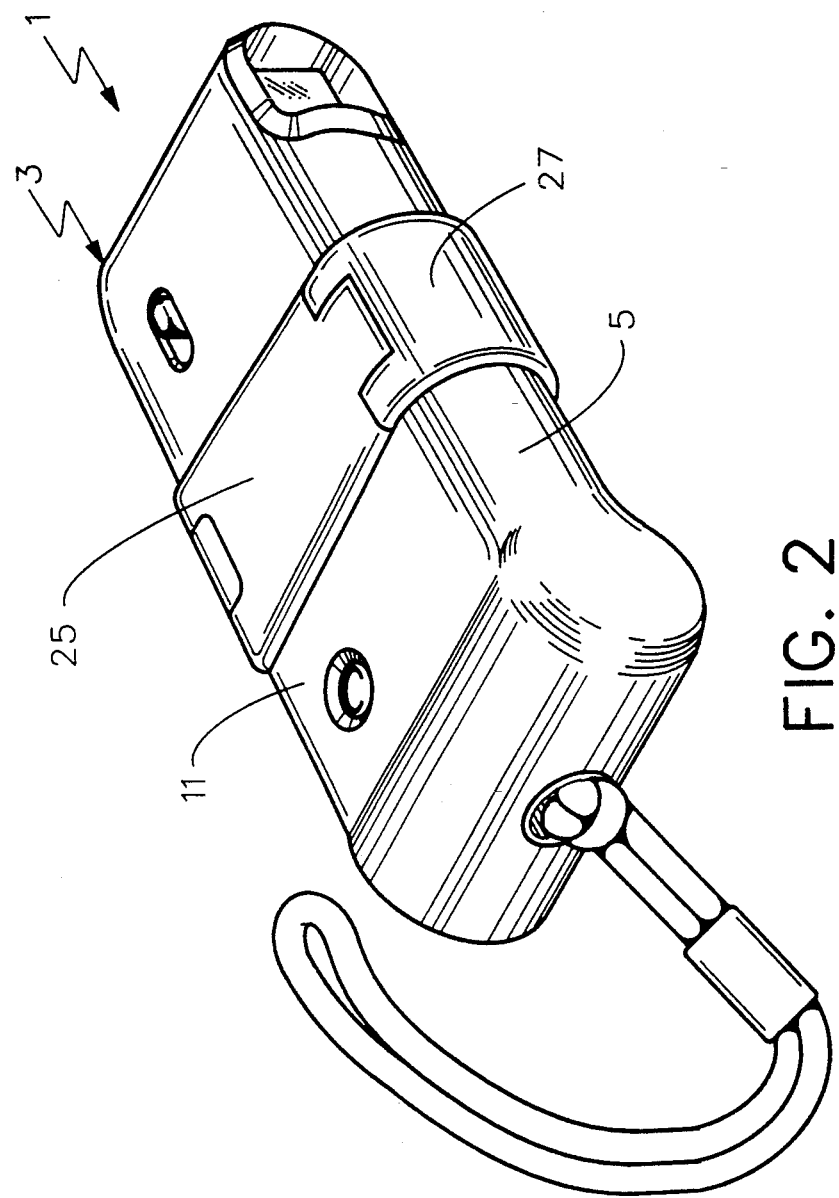
FIG. 2 is a rear perspective view of the compact camera, showing the flash unit in a folded or storage position.
Figure 5:
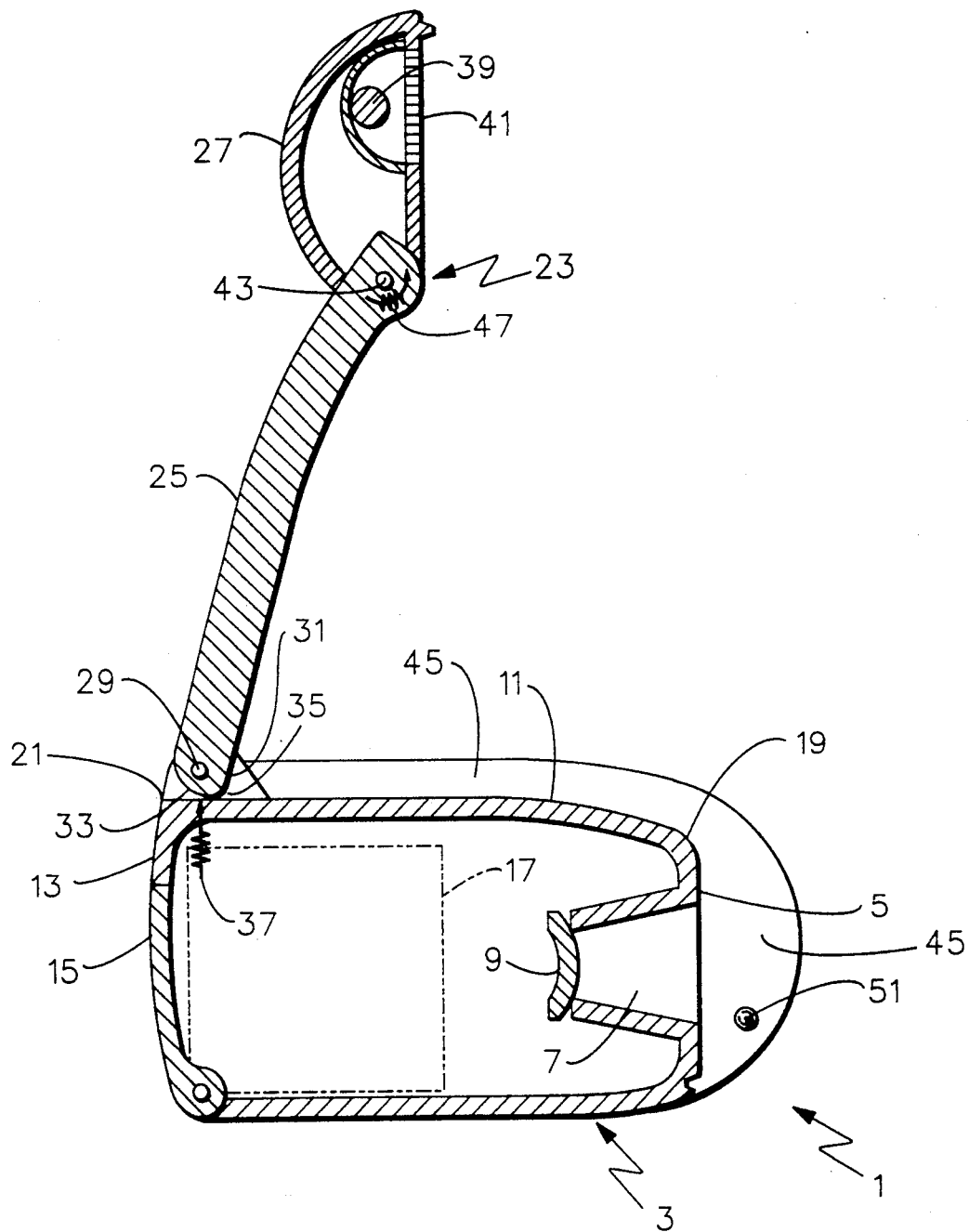
FIG. 5 is a side sectional view similar to FIG. 3, showing the flash unit in its completely unfolded or operative position.

Referring now to the drawings, FIGS. 1 and 5 show a compact camera 1 including a camera body 3 having a front face 5 with a lens opening 7 for a taking (objective) lens 9, a top face 11, and a rear face 13 with a rear door 15 that can be opened to load a conventional size 110 film cartridge 17 into the camera body. The front face 5 and the top face 11 are joined at a juncture 19, and the top face and the rear face 13 are joined at a juncture 21. As can be seen in FIGS. 1 and 2, the top face 11 has substantially more surface area than the front face 5 or the rear face 13.

Figure 3:
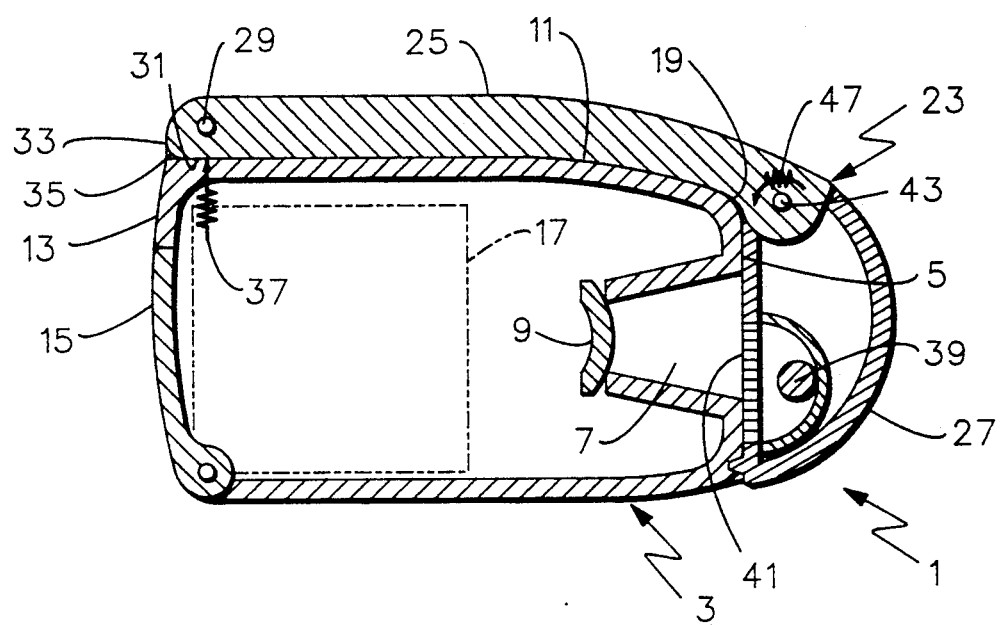
FIG. 3 is side sectional view of the compact camera, showing the flash unit in its folded or storage position.
Figure 4:
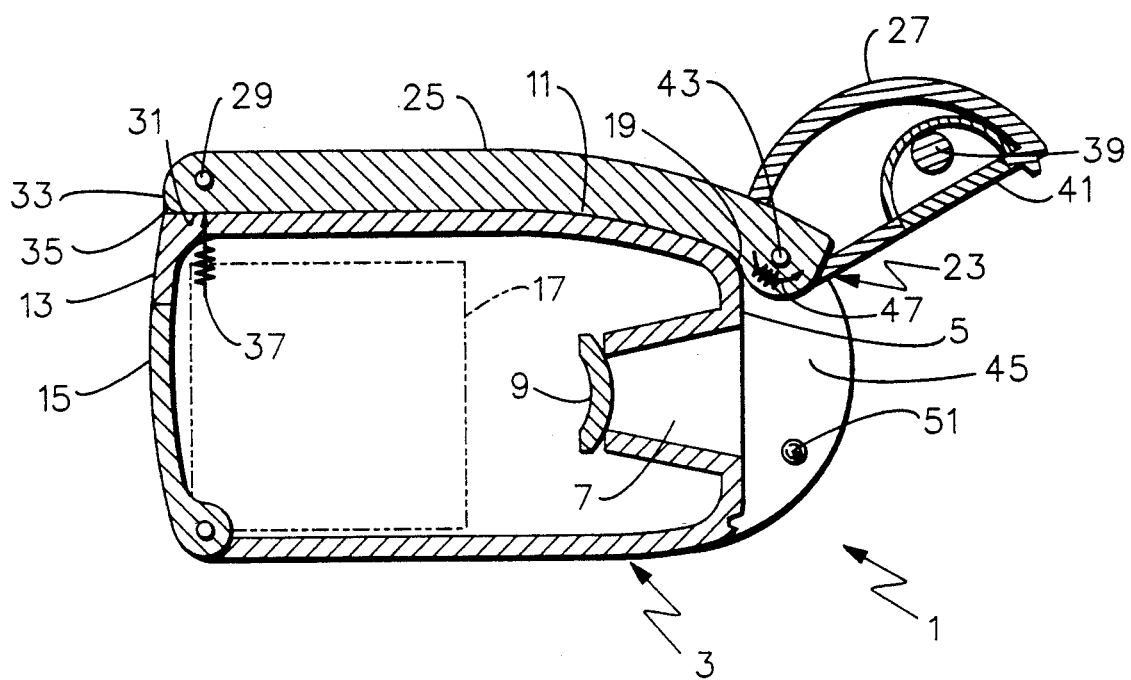
FIG. 4 is a side sectional view similar to FIG. 3, showing the flash unit in an partial unfolded/folded or intermediate position.

A flash unit 23 comprises a flash arm or stem 25 and a flash head 27. The flash arm 25 is pivotally connected via a pivot pin 29 to the camera body 3 at a location that is fixed proximate the juncture 21 between the top face 11 and the rear face 13. This location of the pivotal connection permits the flash arm 25 to lie substantially flat against the top face 11 in a folded position as shown in FIGS. 2, 3, and 4 or to stand up from the top face in an unfolded position as shown in FIGS. 1 and 5. The flash arm 25 has a pair of flat stop surfaces 31 and 33 separated by a curved cam surface 35. An opening/closing spring 35 is secured to the camera body 3 to bear against the stop surface 31 to releasably hold the flash arm in its folded position as shown in FIGS. 3 and 4, to bear against the stop surface 33 to releasably hold the flash arm in its unfolded position as shown in FIG. 5, or to bear against the cam surface 35 to urge the flash arm to its folded position or to its unfolded position depending upon the overcenter condition of the cam surface with respect to the opening/closing spring. The flash head 27 includes a flash tube 39 located behind a flash window 41 and is pivotally connected via a pivot pin 43 to the flash arm 25 at a location that is proximate the juncture 19 between the front face 5 and the top face 11 when the flash arm is in its folded position. See FIGS. 3 and 4. This location of the pivotal connection permits the flash head 27 to lie substantially flat against the front face 5 in a folded position as shown in FIG. 3, to cover the lens opening 7, and to stand out from the front face in an unfolded position as shown in FIG. 4, to uncover the lens opening, when the flash arm 25 is in its folded position. A recess 45 is formed at the front face 5 and at the top face 11 to receive the flash head 27 and the flash arm 25 in their folded positions.

Locking means for releasably holding the flash head 27 in its folded position against the contrary urging of an opening spring 47, to similarly hold the flash arm 25 in its folded position, comprises a pair of identical cavities 49 (only one shown) in opposite sides of the flash head that receive respective spring-urged balls 51 (only one shown) which partly protrude from individual wells (not shown) in the camera body 1. See FIG. 1. To overcome the locking engagement of the balls 51 in the cavities 49, one merely begins to swing the flash head 27 out of its folded position when the flash arm 25 is in its folded position. See FIGS. 3 and 4. Once the balls 51 are removed from the cavities 49, the opening spring 47 acts to swing the flash head 27 to its unfolded position. See FIG. 4. Then the flash arm 25 is free to be swung from its folded position to its unfolded position. See FIG. 5.

The invention has been described with reference to a preferred embodiment. However, it will be appreciated that variations and modifications can be effected within the ordinary skill in the art without departing from the scope of the invention.

I claim:

1. A compact camera comprising a camera body, a flash arm having a pivotal connection with said camera body for movement towards the camera body to a folded position and away from the camera body to an unfolded position, and a flash head having a pivotal connection with said flash arm for movement towards the flash arm to a folded position and away from the flash arm to an unfolded position, is characterized in that:

said camera body has a front face with a lens opening for a taking lens and a top face joined at a juncture with said front face; and said pivotal connection of said flash head with said flash arm is located proximate said juncture of said front face and said top face when the flash arm is in its folded position to permit the flash head to lie substantially flat against the front face to cover said lens opening in its folded position and to stand out from the front face to uncover the lens opening in its unfolded position.

2. A compact camera as recited in claim 1, wherein said camera body has a rear face joined at a juncture with said top face, and said pivotal connection of said flash arm with said camera body is located proximate said juncture of said top face and said rear face to permit the flash arm to lie substantially flat against the top face in its folded position and to stand up from the top face in its unfolded position.

3. A compact camera as recited in claim 1 or 2, wherein said front face has a recess adapted to substantially receive said flash head in its folded position when said flash arm is in its folded position, and said pivotal connection of said flash head with said flash arm permits said flash head to project substantially out of said recess in its unfolded position when said flash arm is in its folded position.

4. A compact camera as recited in claim 1 or 2, wherein locking means releasably secures said flash head to said camera body for releasably holding the flash head in its folded position when said flash arm is in its folded position, thereby to also hold the flash arm in the folded position.

5. A compact camera as recited in claim 2, wherein said top face has substantially more surface area than said front face or said rear face.

6. A compact camera comprising a camera body, a flash arm having a pivotal connection with said camera body for movement towards the camera body to a folded position and away from the camera body to an unfolded position, and a flash head having a pivotal connection with said flash arm for movement towards the flash arm to a folded position and away from the flash arm to an unfolded position, is characterized in that:

locking means releasably secures said flash head to said camera body for releasably holding the flash head in its folded position when said flash arm is in its folded position, thereby to also hold the flash arm in the folded position.

7. A compact camera as recited in claim 6, wherein a spring biases said flash arm to its unfolded position to move the flash arm to that position when said flash head is released from being held in its folded position.

* * * * *